United States Patent
Ramanujan et al.

(10) Patent No.: US 11,194,524 B2
(45) Date of Patent: Dec. 7, 2021

(54) APPARATUS AND METHOD FOR PERFORMING PERSISTENT WRITE OPERATIONS USING A PERSISTENT WRITE COMMAND

(71) Applicant: QUALCOMM Incorporated, San Diego, CA (US)

(72) Inventors: Raj Ramanujan, Federal Way, WA (US); Kuljit Singh Bains, Olympia, WA (US); Liyong Wang, Cary, NC (US); Wesley Queen, Raleigh, NC (US)

(73) Assignee: Qualcomm Incorporated, San Diego, CA (US)

( * ) Notice: Subject to any disclaimer, the term of this patent is extended or adjusted under 35 U.S.C. 154(b) by 109 days.

(21) Appl. No.: 15/706,530

(22) Filed: Sep. 15, 2017

(65) Prior Publication Data

US 2019/0087096 A1   Mar. 21, 2019

(51) Int. Cl.
*G06F 3/06* (2006.01)
*G06F 12/02* (2006.01)
(Continued)

(52) U.S. Cl.
CPC .......... *G06F 3/068* (2013.01); *G06F 11/1471* (2013.01); *G06F 12/0238* (2013.01);
(Continued)

(58) Field of Classification Search
CPC .. G06F 3/068; G06F 11/1471; G06F 12/0238; G06F 12/0804; G06F 12/0862;
(Continued)

(56) References Cited

U.S. PATENT DOCUMENTS

2010/0070631 A1   3/2010   Cherian et al.
2014/0136770 A1*  5/2014   Fitch .................. G06F 12/02
                                              711/103
(Continued)

OTHER PUBLICATIONS

JEDEC press release entitled "JEDEC DDR5 & NVDIMM-P Standards Under Development," dated Mar. 30, 2017, downloaded from https://www.jedec.org/news/pressreleases/jedec-ddr5-nvdimm-p-standards-under-developmenton Jun. 24, 2019, 3 pages.*

(Continued)

*Primary Examiner* — Tuan V Thai
(74) *Attorney, Agent, or Firm* — Qualcomm Incorporated

(57) ABSTRACT

A processing system for performing persistent write operations comprises a host and a memory system. The memory system, upon receiving a Persistent Write command and associated write data from the host, performs a Persistent Write of the write data to a non-volatile memory in the memory system based on the Persistent Write command. The memory system may also a receive a write identification (WID) associated with the Persistent Write command from the host and provide, upon successful completion of the Persistent Write, a Persistent Write completion indication along with the associated WID to the host. Persistent Write completion indications may be provided to the host in a different order from an order in which corresponding commands were received. Statuses of Persistent Write commands may be maintained in a completed bitmap or a pending bitmap. A FLUSH command may be provided to indicate that all prior writes buffered in volatile media are to be pushed to non-volatile or persistent memory. The memory system may include a non-volatile dual in-line memory module which supports Persistent Writes (NVDIMM).

30 Claims, 7 Drawing Sheets

(51) Int. Cl.
*G06F 11/14* (2006.01)
*G06F 12/0804* (2016.01)
*G06F 12/0862* (2016.01)
*G06F 12/0868* (2016.01)

(52) U.S. Cl.
CPC ...... *G06F 12/0804* (2013.01); *G06F 12/0862* (2013.01); *G06F 12/0868* (2013.01); *G06F 2212/2024* (2013.01); *G06F 2212/7203* (2013.01)

(58) Field of Classification Search
CPC ......... G06F 12/0868; G06F 2212/2024; G06F 2212/7203
See application file for complete search history.

(56) References Cited

U.S. PATENT DOCUMENTS

2014/0136786 A1* 5/2014 Carpenter ............... G06F 9/466
711/125
2014/0181373 A1* 6/2014 George ................. G06F 3/0616
711/103
2014/0297595 A1* 10/2014 Larson .................... G06F 9/466
707/648
2016/0034225 A1 2/2016 Yoon et al.
2017/0147207 A1 5/2017 Hansson et al.
2018/0219562 A1* 8/2018 Lee ..................... G06F 11/1012
2018/0329651 A1* 11/2018 Chang .................. G06F 3/0659
2019/0339865 A1* 11/2019 Bains ..................... G06F 3/061
2020/0201577 A1* 6/2020 Longnos .................. G06F 3/06

OTHER PUBLICATIONS

Elsasser, "Emerging NVM Interfaces," Flash Memory Summit 2017, Session R22x103, Santa Clara, CA, Aug. 8-10, 2017, pp. 1 and 12-20 (Year: 2017).*
International Search Report and Written Opinion—PCT/US2018/046590—ISA/EPO—Nov. 28, 2018.

* cited by examiner

| XPWRITE | CA0 | CA1 | CA2 | CA3 | CA4 | CA5 | CA6 | CA7 |
|---|---|---|---|---|---|---|---|---|
| | H | L | L | H | L | ADDRESS [39:37] | | |
| | ADDRESS [36:29] | | | | | | | |
| | ADDRESS [28] | WID [2:0] | | | WID [9:3] | | | |
| | | | | PERSIST | RFU | | | |

*FIG. 3*

APPARATUS AND METHOD FOR PERFORMING PERSISTENT WRITE OPERATIONS USING A PERSISTENT WRITE COMMAND

FIELD OF DISCLOSURE

Disclosed aspects are directed to memory systems. More particularly, exemplary aspects are directed to Persistent Write operations and protocols thereof for non-volatile memory.

BACKGROUND

Storage class memory (SCM) generally refers to high capacity memory which may also have high performance. SCM may be used in applications such as servers or other processing systems wherein an operating set of data for a processor or central processing unit may be stored in the SCM, while the complete data set may be stored in a backing memory or hard disk drive (HDD). An important expectation of the SCM is persistence of writes, which means that information written to the SCM is not to be lost if, say, the server crashes or loses power. Conventional non-volatile memory, which may meet such expectations pertaining to persistence, may not, however, be able to meet the capacity and performance metrics that may be desired of SCM. Therefore, technologies such as Phase Change Memory (PCM), Spin-Transfer Torque Magnetic Random Access Memory (STT MRAM), Resistive RAM (ReRAM), etc., are becoming more popular in implementations of SCM.

When using SCM, an application may use memory write operations to update corresponding persistent memory. For a write to the SCM to be persistent, the application requesting the write operation may expect explicit confirmation that the write operation has reached the persistent memory. By contrast, write operations to non-persistent memory (such as dynamic random access memory (DRAM) or other volatile memory) are conventionally considered to be completed or posted, from the perspective of the application once the write operation and associated data have been transferred to the memory and no explicit confirmation that the data has been written is required. Thus, for applications which use SCM with an expectation of persistence, high performance techniques which provide explicit confirmation of write operations to persistent memory are desirable, wherein the high performance techniques are also compatible with different data sizes in order to maximize efficiency.

There are two types of conventional schemes for persistent memory operations. A first scheme assumes that the entire memory system (e.g., a dual in-line memory module (DIMM) comprising a series of DRAM integrated circuits, as known in the art) is energy-backed. In this case, a write operation to an intermediate buffer on the receiving end of the DIMM may be sufficient to satisfy expectations of persistence. In one implementation, once a write operation across a channel interface between the application requesting the write operation and the DIMM is successfully completed, the write operation may be considered to be persistent. However, implementing such schemes may involve the use of energy storage devices such as supercapacitors or batteries which provide power/charge for flushing the intermediate buffers on the DIMM when a power-failure is detected. But such energy storage devices may not be available on all DIMMs, and further, even if available, they come at high costs.

In a second scheme, all previous write operations may be flushed to persistent memory while the application waits for a completion status from the DIMM. However, this scheme may incur a significant performance cost. For example, in cases wherein the application may be requesting Persistent Writes of fine granularity to the DIMM but there may be other concurrent but independent write operations streaming to the DIMM, flushing all previous write operations to persistent memory pending a completion status may slow down not only the Persistent Write requests but also the concurrent write operations.

Accordingly, there is a need in the art for high performance and high efficiency Persistent Write operations which support different granularities or sizes of the Persistent Writes, while avoiding the aforementioned drawbacks of conventional approaches.

SUMMARY

Exemplary aspects of the invention include systems and methods for persistent operations. A memory system, upon receiving a Persistent Write command and associated write data from a host, performs a Persistent Write of the write data to a non-volatile memory in the memory system based on the Persistent Write command. The memory system may also a receive a write identification (WID) associated with the Persistent Write command from the host and provide, upon successful completion of the Persistent Write, a Persistent Write completion indication along with the associated WID to the host.

For example, an exemplary aspect is directed to a method of performing persistent operations, the method comprising receiving, at a memory system, a Persistent Write command and associated write data from a host, and performing a Persistent Write of the write data to a non-volatile memory in the memory system based on the Persistent Write command.

Another exemplary aspect is directed to a method of performing persistent operations, the method comprising providing, from a host to a memory system, a Persistent Write command and associated write data, wherein the Persistent Write command indicates to the memory system to perform a Persistent Write of the write data to a non-volatile memory.

Another exemplary aspect is directed to an apparatus comprising a memory system configured to receive a Persistent Write command and associated write data from a host, and perform a Persistent Write of the write data to a non-volatile memory in the memory system based on the Persistent Write command.

Another exemplary aspect is directed to an apparatus comprising a host configured to provide a Persistent Write command and associated write data to a memory system, wherein the Persistent Write command indicates to the memory system to perform a Persistent Write of the write data to a non-volatile memory.

Another exemplary aspect is directed to an apparatus comprising a means for storing data, comprising means for receiving a Persistent Write command and associated write data from a host, and means for performing a Persistent Write of the write data to a non-volatile memory in the means for storing, based on the Persistent Write command.

Another exemplary aspect is directed to an apparatus comprising a means for processing, comprising means for providing a Persistent Write command and associated write data to a memory system, wherein the Persistent Write command indicates to the memory system to perform a Persistent Write of the write data to a non-volatile memory.

Another exemplary aspect is directed to a non-transitory computer-readable storage medium comprising code, which, when executed by a processor, causes the processor for performing persistent operations, the transitory computer-readable storage medium comprising code for receiving, at a memory system, a Persistent Write command and associated write data from a host, and code for performing a Persistent Write of the write data to a non-volatile memory in the memory system based on the Persistent Write command.

Another exemplary aspect is directed to a non-transitory computer-readable storage medium comprising code, which, when executed by a processor, causes the processor to perform persistent operations, the transitory computer-readable storage medium comprising code for providing, from a host to a memory system, a Persistent Write command and associated write data, wherein the Persistent Write command indicates to the memory system to perform a Persistent Write of the write data to a non-volatile memory.

BRIEF DESCRIPTION OF THE DRAWINGS

The accompanying drawings are presented to aid in the description of aspects of the invention and are provided solely for illustration of the aspects and not limitation thereof.

FIG. 3 illustrates an example encoding for a Persistent Write command according to this disclosure.

DETAILED DESCRIPTION

Figure 1:
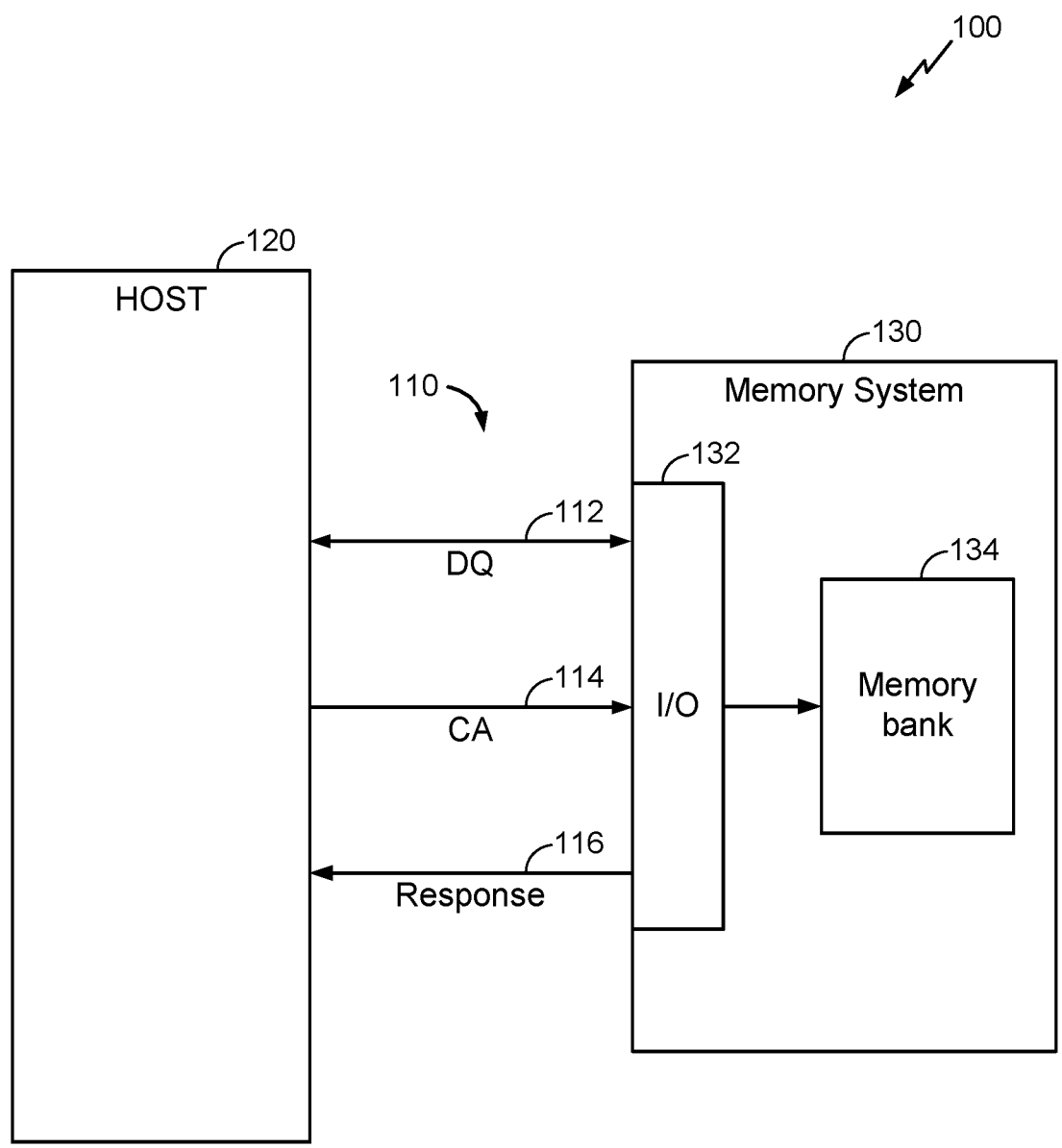
FIG. 1 illustrates a processing system according to aspects of this disclosure

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to efficient and high performance Persistent Write operations for non-volatile memory such as non-volatile DIMM (or NVDIMM). Correspondingly, a persistent NVDIMM or NVDIMM-P is disclosed as one example memory system which supports Persistent Write operations according to exemplary aspects. A host device may be configured to provide exemplary requests/commands, e.g., for persistent operations, and corresponding data to an exemplary memory system, and the memory system may be configured to perform the requested Persistent Write operations and provide corresponding signaling to the host device as will be discussed in further detail in the following sections.

With reference now to FIG. 1, an exemplary processing system 100 is shown comprising host 120 and memory system 130. Host 120 can comprise one or more processing elements such as a central processing unit (CPU), digital signal processor (DSP), multimedia processor, system processor, graphics processing unit (GPU), modulator-demodulator (modem), applications processor, etc., even though they have not been explicitly illustrated. These processing elements may make requests for accessing memory system 130. A memory controller (not shown) may be present in host 120 to control these access requests.

Memory system 130 may be a persistent memory, e.g., a NVDIMM-P according to this disclosure. Memory system 130 is shown to include input/output (I/O) block 132 and memory bank 134. Memory bank 134 may include Flash memory, DRAM, etc.

Interconnect 110 is shown between host 120 and memory system 130, with data bus (DQ) 112, command and address bus (CA) 114, and response 116 separately identified. Host 120 may be able to provide commands and related addresses for memory access requests via CA 114 and send/receive data via DQ 112 (shown as a two-way bus). Response 116, although shown separately, may be configured as a part of CA 114 and may be implemented as a bidirectional bus in some cases. Response 116 may be used to provide information such as status of Persistent Writes in some example aspects. Various other buses/wires may also be present in interconnect 110 although these have not been separately identified. In some instances, memory system 130 may use separate buses for deterministic and non-deterministic responses, which will be explained further below.

In an implementation wherein memory system 130 may be configured as an NVDIMM, with further support for a persistent NVDIMM (NVDIMM-P) configuration for at least some operations, host 120 may be able to provide one or more of the following exemplary commands to memory system 130, e.g., on CA 114:

- READ command (e.g., with length encoding in multiples of 64 B), along with a read identification (RID);
- WRITE command (e.g., a conventional write command);
- P-WRITE command (e.g., a Persistent Write command, along with a write identification (WID) for Persistent Writes, along with a persist bit that indicates when writes with a given WID need a Persistent Write complete (W_PER) signal (e.g., to be provided on response 116) from memory system 130);
- ADRx command: Extended addressing;
- SEND command (e.g., a command for memory system 130 to provide status of a read data request);
- SEND_Status command (e.g., a command for memory system 130 to provide error readout, WIDs, etc. related to persistent operations from memory system 130);
- FLUSH command (to flush prior writes to be pushed to persistent memory)
- NOP (no-operation);
- Speculative Read command (e.g., used for reading cached memory); and
- Other Caching commands, which may be implementation specific.

As previously mentioned, separate buses may be provided in interconnect 110 for deterministic and non-deterministic responses from memory system 130 to host 120. Deterministic responses include metadata, error/parity information such as error control coding (ECC) pertaining to read data sent on DQ 112 to host 120, etc., which may be multiplexed on buses emanating from pins coupled to I/O 132, such as check bit pins.

Among ECC bits, there may be media ECC specific to implementations of memory system 130 (e.g., as a NVDIMM) and channel specific ECC bits on DQ 112, for example, which may be standardized to enable cross-compatibility across various implementations.

Metadata bits may include delayed RIDs for read requests sent out of program order (wherein, for in-order operations, the RID may be set to a "don't-care" status). Metadata bits may also include a write credit (WC), which refers to unused quota for write operations allocated to certain hosts or processing elements of host 120. Metadata bits may further include data poisoning bits for data from a user equipment as known in the art, and other user-defined bits.

Non-deterministic responses according to this disclosure may pertain to persistent operations and may be sent through dedicated signaling such as response 116 from memory system 130 to host 120, and may indicate the following:

- R_RDY: a signal from memory system 130 to host 120 to indicate that read data is available;
- Wr_Per: a signal from memory system 130 to host 120 to indicate that a Persistent Write has completed; and
- ERROR: a signal from memory system 130 to host 120 to indicate error conditions such as cyclic redundancy check (CRC) check, credit violation, media timeout, etc.

For an implementation of memory system 130 as NVDIMM-P, the following protocol pins may be defined in I/O 132, for example. Using Pulse Width Modulation, the following pin and response signal configurations may be implemented. For example, in a double-data rate 5 (DDR5) implementation of NVDIMM-P, a single wire labeled as RSP_n (one dedicated per sub-channel) may be used to provide the following signaling: 2 clock pulse low for R_RDY, 4 clock pulse low for W_PER, and 6 clock pulse low for MESSAGE. Each low pulse may be followed by at least 2 clock high pulses. If a separate ERROR signal is needed then it may be defined as an 8 clock low pulse.

For a DDR4 implementation: two pins may be used to address performance issues with a single pin (ODT1 and CKE1), wherein ODT1 represents a 2 clock low pulse width for R_RDY and a 4 clock low pulse for MESSAGE, and CKE1 represents a 2 clock low pulse for W_PER. Each low pulse may be followed by at least 2 clock high pulses, and if a separate ERROR signal is needed, then it may be defined as a 6 clock low pulse on ODT1.

In exemplary implementations of Persistent Writes, suitable combinations of hardware, software, firmware, etc. (e.g., applications, drivers, etc.) may be configured to enable notifications to be provided to host 120 from memory system 130 when one or more write requests from host 120 to memory system 130 achieve persistence. These notifications may be implementation specific, as explained below.

When data to be written for a write operation reaches a power-fail protected buffer on a media controller (e.g., a power-fail protected memory of memory system 130), the write operation may be considered persistent during normal operations. However for certain infrequent cases or when media controller buffers are not power-fail protected, software will ensure that the writes are pushed all the way to non-volatile memory (NVM) media For an implementation of memory system 130 as a NVDIMM-P, energy-backed DIMMs involve configurations wherein the aforementioned buffers are power-fail protected, which means that the NVDIMM-P Write command can be used even when persistence is required for the normal cases. Additionally, an NVDIMM-P Flush command, as defined herein, can be used to flush all writes in media controller buffers to the non-volatile memory. In the case of the Flush command, only writes that occurred prior to the Flush are guaranteed to be made persistent to non-volatile memory. Software-implemented commands such as appropriate barrier operations may be used after the last write and before the Flush command is issued to ensure the correct order of the writes is maintained (e.g., when host 120 may be configured to send Persistent Write requests out of program order).

Although non-energy-backed DIMMs may be less commonly used than the energy-backed DIMMs discussed above, the NVDIMM-P Persistent Write command may be used when persistence is required for the non-energy-backed DIMMs as well. A memory controller of host 120, as previously mentioned, may be configured to determine when to issue the Persistent Write command In this case, memory system 130 is expected to provide explicit notification when the Persistent Write is completed, as will be discussed with reference to FIG. 2A. Further, an NVDIMM-P Flush command may also be used as before to flush all writes (even non-Persistent Writes) to the non-volatile memory.

Figure 2A:
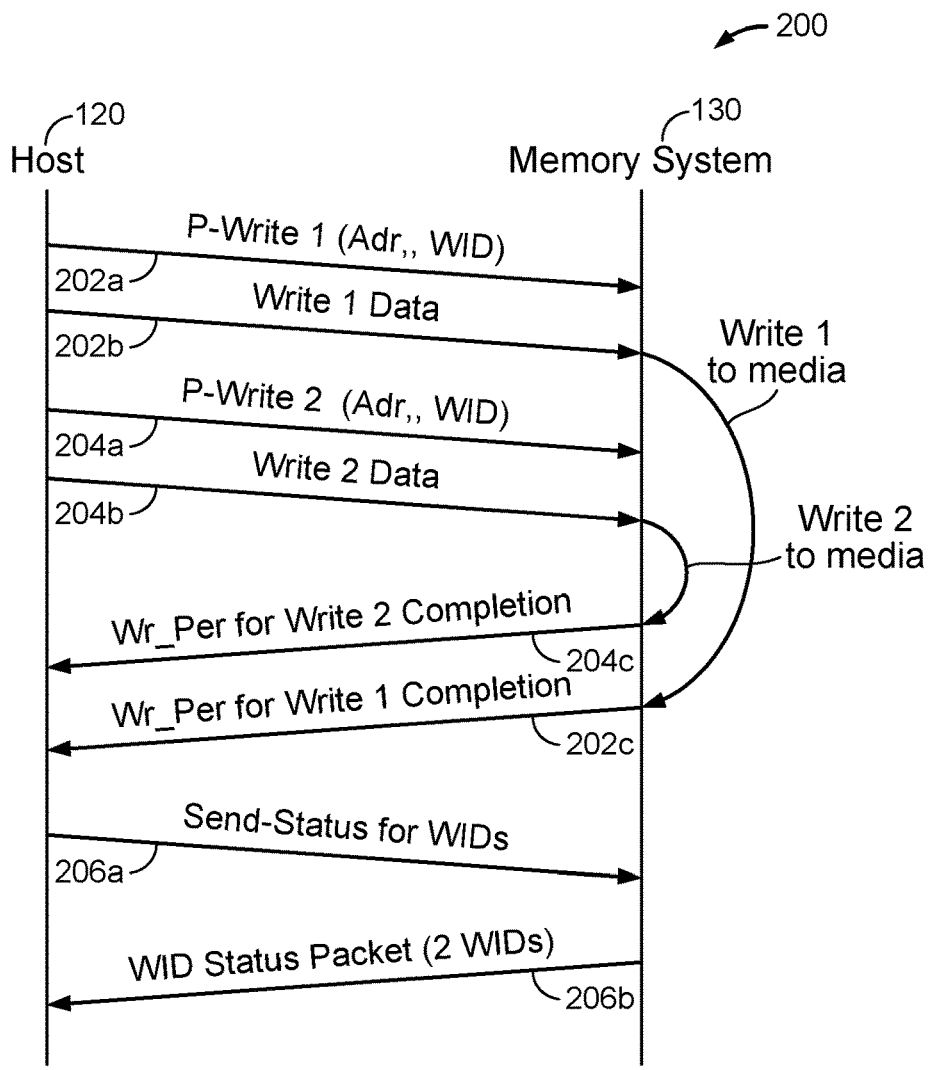
FIGS. 2A-C illustrate transactions for handling Persistent Writes, according to various aspects of this disclosure.
Figure 2A:
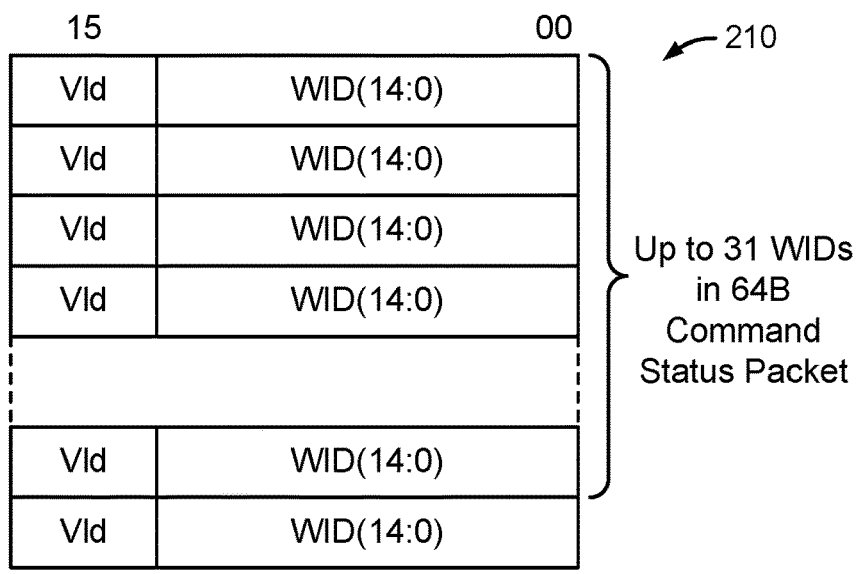

With reference now to FIG. 2A, an example set of transactions is shown between host 120 and memory system 130 to illustrate aspects of the Persistent Write command. There are some features of the exemplary Persistent Write (P-Write) command (or simply, "Persistent Write") which may be common to the above-described Read command from host 120. These include a common write identification (WID), which may be a multi-bit identifier to identify specific write instructions. An example set of WIDs 210 is shown, which may be up to 16-bits wide each, which includes one valid bit "Vld" (accordingly, up to 31 WIDs may be present in a 64-byte command status packet sent on CA 114, for example). The Persistent Write command may also have a reserved field in the WID encoding for Flush command status returns which will be further explained in the following passages.

In one aspect, host 120 may be configured to issue a Persistent Write only when host 120 has associated Persistent Write credits available. Persistent Write credits (similar to Read credits known in the art) may be determined during configuration and managed by host 120, and may reflect a number of outstanding Persistent Writes host 120 is allowed to issue.

Once issued, host 120 may be configured to track outstanding Persistent Writes based on their respective WIDs 210. In FIG. 2A (with combined reference to FIG. 1), two Persistent Writes (P-Write 1 with a first address and WID, and P-Write 2 with a second address and WID) labeled 202a and 204a are shown, issued from host 120 to memory system 130 on CA 114, along with respective data, write 1 data 202b and write 2 data 204b on DQ 112, for example.

Memory system 130 is configured to issue a response "Wr_Per" on response 116, for a particular Persistent Write, once all the data for that Persistent Write has been written to non-volatile memory in memory system 130. Wr_Per 202c and Wr_Per 204c are shown for respective Persistent Writes 202a and 204a. However, Wr_Per 202c and Wr_Per 204c are shown to be sent in a different order than Persistent Writes 202a and 204a were received by memory system 130 to illustrate that the responses need not be in program order or in the order in which Persistent Write requests are received from host 120. In an aspect, memory system 130 may assert the signal "Req" on response 116 along with the appropriate encoding for the message "Write_Rdy" for the Wr_Per responses.

Further, host 120 may also be configured to issue a "Send-Status for WIDs" command designated with the reference numeral 206a, at any time, to determine status of its outstanding Persistent Writes. In response, memory system 130 may be configured to issue a status packet with WIDs of completed Persistent Writes, e.g., in a burst length of 8 or "BL8" transfer over DQ 112.

As previously mentioned, up to 31 WIDs 210 may be packed in each 64B status packet, wherein for each WID 210 there may be 16-bits assigned for the 15-bit WID and the Valid bit, combined. Further, memory system 130 may also use the previously mentioned metadata field to return status for other writes. Host 120 may use the returned WIDs 210 in WID status packet 206b, for example, to terminate tracking of outstanding Persistent Writes.

In some aspects, two or more Persistent Writes may be grouped. For example, a set of 64 B Persistent Writes may be grouped for committing (or writing to non-volatile memory) in the case of non-energy backed DIMMs, for example. An example implementation may involve a block of Persistent Writes to be issued to memory system 130 from host 120, wherein memory system 130 may be configured to collect up to the block of Persistent Writes in a buffer and commit all of the block of Persistent Writes at once, which may lead to improved efficiency. It will be understood, however, that grouping Persistent Writes and committing them in a block is not required for energy-backed DIMMs wherein the buffers are power-fail protected.

The following modifications may be made to the Persistent Write command to implement the group commits discussed above. Host 120 may pick a single WID (from WIDs 210, for example) for a set of two or more writes. An additional bit termed as "Persist" may be added to the Persistent Write command when sent on CA 114, for example. The Persist bit may be used to determine when the entire group of Persistent Writes has been sent to memory system 130.

For example, three 64B Persistent Writes may be grouped together as follows using WID=5 in an illustrative example. A first Persistent Write (WID=5, Persist=0), second Persistent Write (WID=5, Persist=0), and third Persistent Write (WID=5, Persist=1) may be sent on CA 114. Memory system 130 may be configured to collect the Persistent Writes with WID=5 in a buffer while Persist bit is 0, and when the last Persistent Write arrives with Persist bit set to 1, initiate the processes of persistence committing.

In one implementation, only a Persistent Write with a Persist bit set to 1 may be configured to get a Wr_Per response from memory system 130 (e.g., only the third Persistent Write in the above example) for the group of Persistent Writes. This may reduce the traffic on response 116.

In some aspects, Persistent Writes with different WIDs may be interleaved, e.g., on CA 114. Accordingly, grouping of Persistent Writes for persistent commit does not imply that the Persistent Writes in a group with the same WID are sent consecutively from host 120.

In some aspects, to address race conditions which may arise in the Wr_Per responses to Persistent Writes, a Write Group ID (WGID) status method may be used to group statuses of one or more Persistent Writes, using different bitmaps, such as a WGID-completed bitmap and WGID-pending bitmap, as will be explained with reference to FIG. 2B below. Considering the Persistent Writes with respective WIDs, memory system 130 may assert a respective Wr_Per (referred to as "W_PER" for this case) for each Persistent Write with Persist=1 and for each Flush completion. Host 120 may use another command Send-W_PER-Status after receiving one or more W_PERs (wherein, host 120 may also maintain a count of the W_PERs, referred to as W_PER-Count). Memory system 130 may return WGID-Completed Status with completed bits only based on W_PERs already asserted. In turn, host 120 may update a list for the WGID, or "WGID list" and decrement the W_PER-Count based on number of completions.

In some cases, an uncorrectable error (UE) may occur in the transactions, which will be discussed with reference to FIG. 2C. When there is a UE in the Send-W_PER-Status, host 120 may stop issuing new Persistent Writes/Flushes and Send-W_PER-Status. Host 120 may send a status read command referred to as Xread-Status to memory system 130. Memory system 130 in turn collects all Persistent Writes prior to receiving the Xread-Status to return WGID-Pending Status to host 120 (the status packets cover W_PER assertion before a RD_RDY is received) and memory system 130 can continue issuing W_PER during status reads. Host 120 may update the WGID List maintained by host 120 and decrement W_PER-Count based on pending writes. Host 120 can then start to re-issue the Persistent Writes/Flushes.

For energy-backed DIMM implementations of memory system 130, in a normal protocol, host 120 may issue Persistent Write commands or Persistent Writes (with Persist=0/1) and Flush, but memory system 130 will not assert W_PER for each Persistent Write with Persist=1, but memory system 130 will assert W_PER for the Flush command when the Flush completes. In the case of WGID implementations, the W_PER handling by memory system 130 remains the same as the normal protocol only for Flushes. A WGID Completed Status bitmap provided by memory system 130 will have Flush WGID bits set when they complete. When there is a UE in Send-W_PER-Status, the operation remains the same as the normal case, except that the WGID Pending Status is only applicable for Flushes.

Credits for WGID implementations may be handled as follows. Separate Credits may be maintained for status writes or Xwrites and for Persistent Writes, wherein host 120 may determine how a pool of credits may be allocated by memory system 130. Incremental Credit Return may be provided by Read Metadata, wherein an encoding scheme to return Xwrite or Persistent Write credits may be used. X-Read-Status returns may be available for Xwrite and Persistent Write buffer slots based on credit allocation.

In an implementation, e.g., which will be described with reference to FIGS. 2B-C, memory system 130 may complete Persistent Writes (referred to as PWRITEs herein) and Flushes in any order. To persist a specific PWRITE to media, host 120 may issue a PWRITE for a given WGID with Persist=1 or issue a PWRITE with Persist=0 followed by any of the Flush types. Memory system 130 may issue W_PER for each completed PWRITE that has the Persist=1 in the command as well as every completed Flush. If multiple PWRITEs are grouped with a single WGID with Persist=1 only in the last PWRITE terminating the group, memory system 130 may issue W_PER only when the entire group of PWRITEs complete.

Figure 2B:
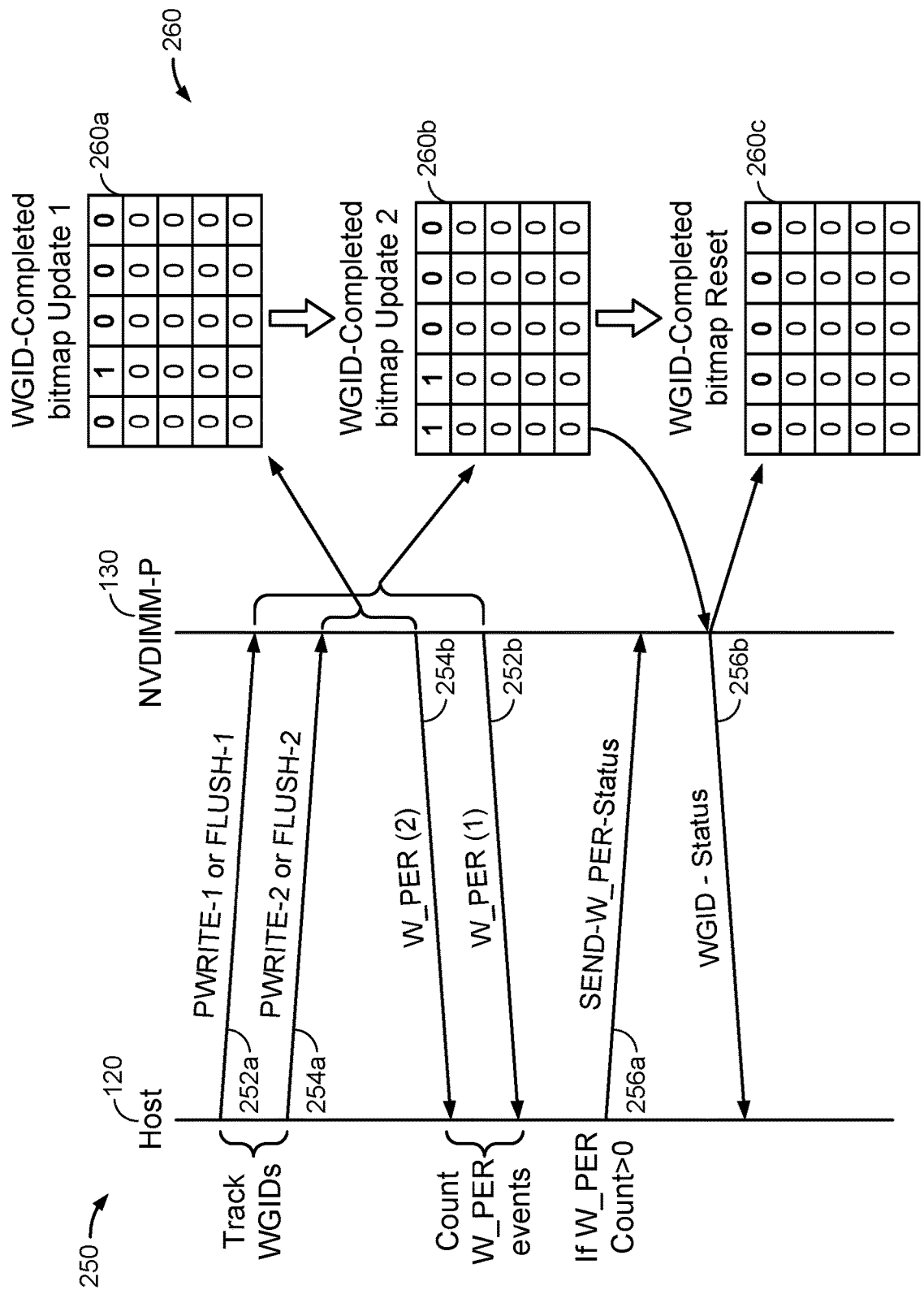

Referring now to FIG. 2B, W_PER handling will be described for a normal case. System 250 is shown with host 120 and NVDIMM-P memory system 130. If both Write-Credits and free WGID are available, then host 120 may issue one or more PWRITEs or FLUSH commands shown as 252a, 254a. Host 120 may track the issued PWRITEs or FLUSH commands 252a, 254a in a Host-WGID-Pending list (not shown, but may be maintained within host 120).

Correspondingly, memory system 130 may accept and track the pending PWRITEs or FLUSH commands 252a, 254a in a DIMM-WGID-Pending list (not shown). Memory system 130 may execute the pending PWRITEs or FLUSH commands 252a and 254a and assert corresponding W_PERs 252b and 254b (note, shown in reverse order of the received PWRITEs or FLUSH commands 252a, 254a in FIG. 2B, i.e., W_PER 254b is shown being asserted before W_PER 252b) to host 120 after respective completion of each received command.

Memory system 130 may collect the completed received PWRITEs commands or FLUSH commands 252a, 254a in WGID-Completed bitmap 260, to which various updates 260a, 260b, 260c, etc., are shown. Memory system 130 may also remove the completed PWRITEs or FLUSH commands 252a, 254a from the DIMM-WGID-Pending list.

Host 120 may maintain a count of received W_PER events, e.g., for receiving W_PERs 254b, 252b, referred to as W_PER-Count. Concurrently, host 120 may handle the received W_PER events as follows: if the W_PER-Count>0, then host 120 may issue a status request shown as Send-W_PER Status 256a. After a predefined time, referred to as Tsend time, memory system 130 may send a snapshot of WGID-Completed bitmap 260 at that time instance (260b in this case) in the response shown as a WGID_Status 256b to host 120. The snapshot may include completions for W_PERs issued up to the start of WGID_Status 256b transfer to host 120.

In some aspects, 1 completion at a minimum is logged in the snapshot. Memory system 130 clears bit positions in WGID-Completed bitmap 260 based on completions sent in WGID_Status 256b, shown by the transition of WGID-Completed bitmap 260b to WGID-Completed bitmap 260c after the reset or clearing of the bit positions.

Host 120 receives WGID-Status 256b and may extract information regarding the completed WGIDs. Correspondingly, host 120 may free up completed WGIDs from the Host-WGID-Pending list and decrement W_PER-Count by the number of completions received in WGID-Completed bitmap 260 (e.g., decrement a count of 2 based on the two W_PERs received as indicated by WGID-Completed bitmap 260b). Host 120 may repeat the above process starting with monitoring W_PER-Count and if the W_PER-Count>0, then issuing another status request Send-W_PER Status 256a to memory system 130.

In exemplary implementations, host 120 and memory system 130 may continue to issue and execute new PWRITEs while W_PER event processing is underway. Although the W_PER-Count and pending lists such as HOST-WGID-Pending list, DIMM-WGID-Pending list, etc., have been discussed for an example implementation, alternative structures for achieving the above-described functionality may be used without deviating from the scope of this disclosure.

Figure 2C:
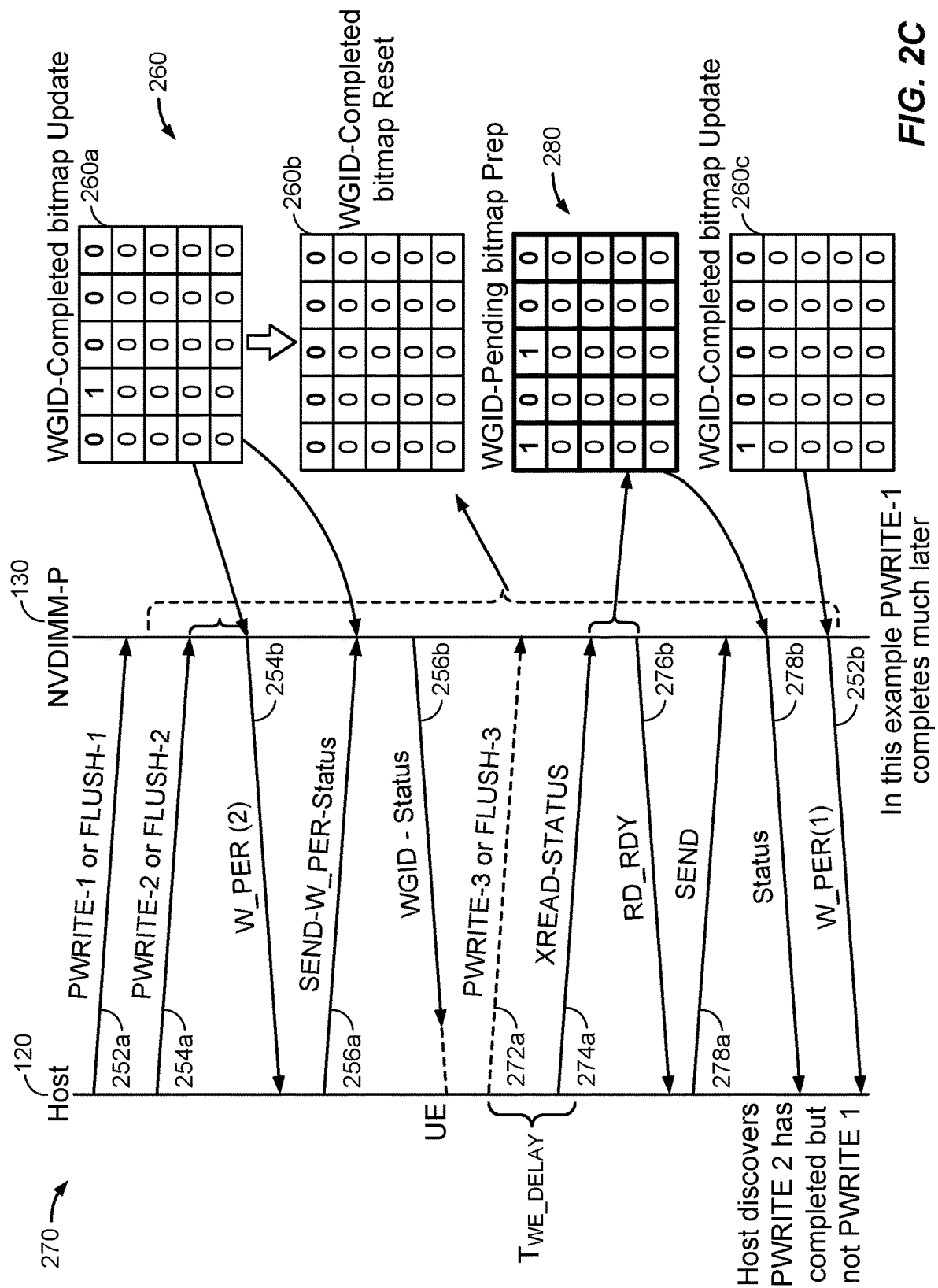

Referring now to FIG. 2C, system 270 for handling a channel Uncorrectable Error (UE) following SEND-W_PER-Status from host 120 which results in loss of the completions sent in WGID_Status 256b (explained in FIG. 2B above) from memory system 130, is shown. Further, it is noted that memory system 130 may have cleared the prior completions from WGID-Completed bitmap 260 in FIG. 2B.

Accordingly, in a protocol for recovering from such errors in system 270, host 120 may initiate the recovery process by stopping issue of new PWRITE or FLUSH Commands (e.g., PWRITE-3 or FLUSH-3 272a is not issued, shown in dashed lines to indicate the timeline that they would have been issued had the error not occurred), while memory system 130 may continue to issue RD_RDY and/or W_PER events for completed reads or PWRITEs or FLUSH commands (e.g., W_PER(2) 254b is shown to be issued whereas 252b is not issued until after error recovery). Host 120 may also continue to issue SEND and update W_PER-Count.

After a pre-specified minimum time delay for a write enable signal, referred to as TWE_Delay following the last PWRITE, host 120 issues XREAD-STATUS 274a to memory system 130, and memory system 130 may prepare a complete Status packet with a snapshot of WGID-Pending bitmap 280, which is another bitmap provided in addition to WGID-Completed bitmap 260 discussed above, wherein WGID-Pending bitmap 280 includes the status of all Pending PWRITEs/FLUSHes. Memory system 130 may assert RD_RDY 276b, and host 120 may issue SEND 278a in response.

Memory system 130 may then return the prepared Status packet 278b from which host 120 may extract and process WGID-Pending bitmap 280 received in Status packet 278b. Host 120 may free appropriate WGIDs from its Host-WGID-Pending tracking list and decrement W_PER-Count by the number of freed WGIDs. Host 120 may then repeat the processes starting with issuing new PWRITE/FLUSH commands and process pending W_PERs at this time as discussed above.

In some aspects, the Status Packet 278b is configured to indicate whether it has the WGID-Completed bitmap 260 or WGID-Pending Bitmap 280. W_PER response status packets contain WGID-Completed Bitmap 260, while all other status packets contain WGID-Pending Bitmap 280. The TWE_Delay time is configured to account for the time to get error notification from memory system 130 for the last PWRITE issued from host 120, and the wait time from UE detection before XREAD-STATUS 274*a* issued from host 120 may vary depending on when the last PWRITE was issued.

With reference to FIG. 3, an example encoding for Persistent Writes, e.g., for a DDR5 implementation of memory system 130 is shown. The CA1 field is typically used to differentiate between 1 unit interval (1 UI) and 2 unit interval (2 UI) commands in DDR5 technology and may be retained for NVDIMM-P implementations. CA 114, in some implementations may be configured at DDR speeds for DDR5 with only 7 pins, and in such cases, a separate command encoding may be used for Persistent Writes, e.g., as shown in FIG. 3.

In FIG. 3, if Persist bit=1 this indicates that memory system 130 is to push all Persistent Writes associated with the respective WID to non-volatile memory. If there is a single 64B Persistent Write in a group, Persist bit may be set to 1. For Persistent Writes larger than 64B, all Persistent Writes may have the same WID, with the last Persistent Write having its Persist bit set to 1 while the remaining Persistent Writes have their Persist bits set to 0.

In addition to the above transactions, as introduced in the prior sections, another command may also be used in association with Persistent Writes, termed as the FLUSH command. The FLUSH command is configured to indicate to memory system 130 that all prior writes buffered (e.g., in non-persistent or volatile memory) are to be pushed to persistent memory, keeping in mind that future writes may not be similarly affected or pushed to persistent memory when using the FLUSH command.

When execution of the FLUSH is completed, memory system 130 may once again assert Wr_Per, e.g., on response 116 to host 120, similar to the case of the Persistent Writes discussed above.

Further, host 120 may also provide the command Send-Status for WIDs (similar to Persistent Writes) to memory system 130 in the case of the FLUSH command, to which memory system 130 may respond with a WID Status Packet with a unique reserved WID to indicate completion of the FLUSH execution (e.g., WID with all bits set to 1 may be such a reserved WID used to indicate completion of FLUSH execution).

In one implementation, only one outstanding FLUSH command from host 120 may be allowed. Thus, in this implementation, host 120 may have to wait for the FLUSH completion response from memory system 130 before sending another FLUSH command In alternative implementations, FLUSH commands may be accompanied with corresponding FLUSH IDs (e.g., selected from reserved WID fields) and a corresponding Response to Send-Status may cause memory system 130 to return FLUSH IDs whose FLUSH execution has been completed.

Figure 4A:
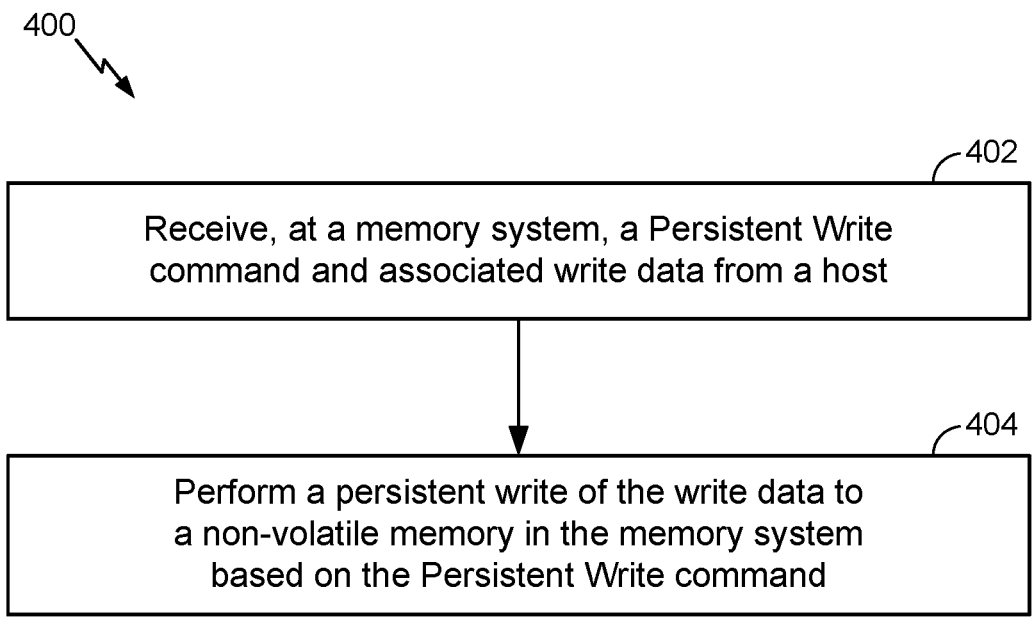
FIGS. 4A-B illustrate exemplary methods of performing Persistent Write operations, according to aspects of this disclosure.

It will be appreciated that aspects include various methods for performing the processes, functions and/or algorithms disclosed herein. For example, FIG. 4A illustrates an exemplary method 400 of performing persistent operations.

Block 402 comprises receiving, at a memory system (e.g., memory system 130), a Persistent Write command (e.g., Persistent Write 202*a*) and associated write data (e.g., data 202*b*) from a host (e.g., host 120).

Block 404 comprises performing a Persistent Write of the write data to a non-volatile memory in the memory system (e.g., to a non-volatile memory in memory system 130) based on the Persistent Write command. A write identification (WID) associated with the Persistent Write command may be received from the host and upon successful completion of the Persistent Write, a Persistent Write completion indication (Wr_Per) along with the associated WID (e.g., Wr_Per 202*c*) may be provided to the host.

Figure 4B:
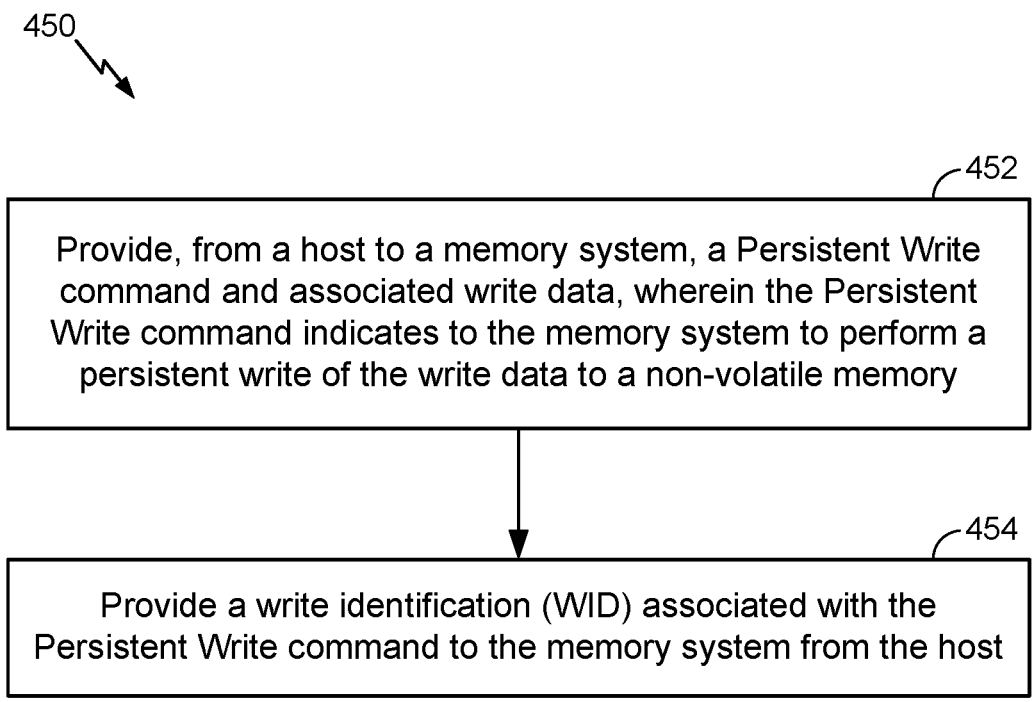

Similarly, FIG. 4B illustrates another exemplary method 450 of performing persistent operations.

Block 452 comprises providing, from a host (e.g., host 120) to a memory system (e.g., memory system 130), a Persistent Write command (e.g., Persistent Write 202*a*) and associated write data (e.g., data 202*b*) wherein the Persistent Write command indicates to the memory system to perform a Persistent Write of the write data to a non-volatile memory.

Block 454 comprises providing a write identification (WID) (e.g., WID 210) associated with the Persistent Write command to the memory system from the host.

Figure 5:
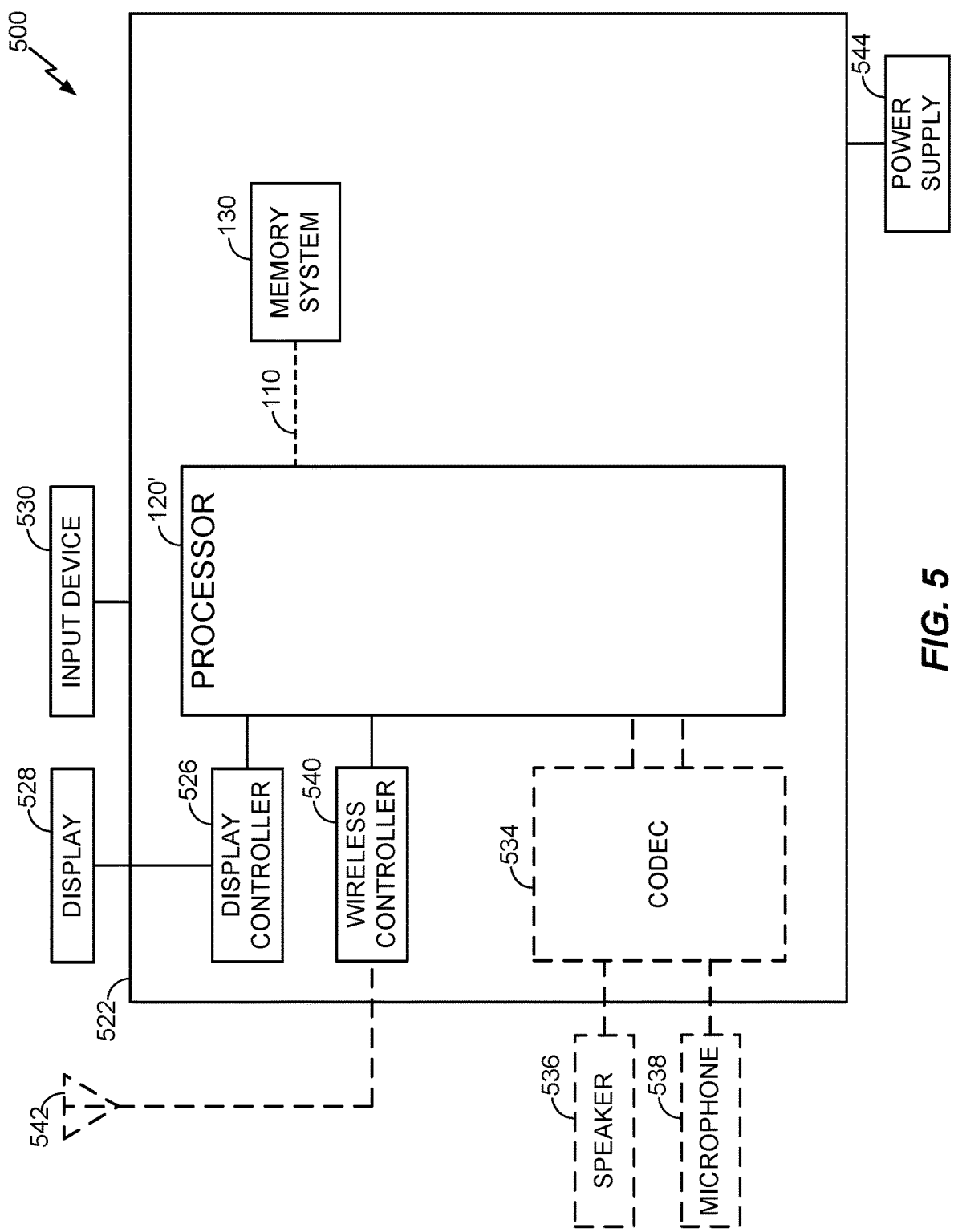
FIG. 5 depicts an exemplary apparatus such as a computing device for performing Persistent Write operations.

An example apparatus in which aspects of this disclosure may be utilized, will now be discussed in relation to FIG. 5. FIG. 5 shows a block diagram of computing device 500. Computing device 500 may correspond to an exemplary implementation of a processing system 100 of FIG. 1, wherein processor 120' may be one of the processing elements of host 120. Processor 120' is exemplarily shown to be coupled to memory system 130 through interconnect 110, with further details of interconnect 110 omitted from this view for the sake of clarity. Processor 120', interconnect 110, and memory system 130 may be configured to perform methods 400-450 as discussed above. It will be understood that other memory configurations known in the art such as involving one or more levels of caches, although not shown, may be present in computing device 500.

FIG. 5 also shows display controller 526 that is coupled to processor 120' and to display 528. In some cases, computing device 500 may be used for wireless communication. FIG. 5 also shows optional blocks in dashed lines, such as coder/decoder (CODEC) 534 (e.g., an audio and/or voice CODEC) coupled to processor 120', speaker 536 and microphone 538. Wireless antenna 542 is coupled to wireless controller 540 which is coupled to processor 120'. Where one or more of these optional blocks are present, in a particular aspect, processor 120', display controller 526, memory system 130, and wireless controller 540 are included in a system-in-package or system-on-chip (SoC) device 522.

Accordingly, a particular aspect, input device 530 and power supply 544 are coupled to the system-on-chip device 522. Moreover, in a particular aspect, as illustrated in FIG. 5, where one or more optional blocks are present, display 528, input device 530, speaker 536, microphone 538, wireless antenna 542, and power supply 544 are external to the system-on-chip device 522. However, each of display 528, input device 530, speaker 536, microphone 538, wireless antenna 542, and power supply 544 can be coupled to a component of the system-on-chip device 522, such as an interface or a controller.

It should be noted that although FIG. 5 depicts a computing device including the processor 120' and memory system 130, the processor 120' and memory system 130 may also be integrated into a set top box, a server, a music player, a video player, an entertainment unit, a navigation device, a personal digital assistant (PDA), a fixed location data unit, a computer, a laptop, a tablet, a communications device, a mobile phone, or other similar devices.

Those of ordinary skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of ordinary skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in random access memory (RAM) memory, flash memory, read only memory (ROM) memory, erasable programmable read only memory (EPROM) memory, electrically erasable programmable read only memory (EEPROM) memory, registers, hard disk, a removable disk, a compact disc-read only memory (CD-ROM), or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method of performing Persistent Writes. Accordingly, the invention is not limited to illustrated examples described herein.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of performing persistent operations, the method comprising:
   receiving, by a non-volatile dual in-line memory module (NVDIMM) configured to support Persistent Writes, a Persistent Write command and associated write data from a host;
   performing a Persistent Write of the write data to a non-volatile memory in the NVDIMM based on the Persistent Write command;
   receiving a write identification (WID) associated with the Persistent Write command from the host upon successful completion of the Persistent Write;
   receiving, from the host, a request to send status for multiple Persistent Writes along with associated WIDs; and
   receiving, by the NVDIMM, a group of two or more Persistent Write commands with a common WID, with the last Persistent Write command of the group having a Persist bit set to 1 and the remaining Persistent Write commands having respective Persist bits set to 0 and providing a Persistent Write completion indication for the last Persistent Write command.

2. The method of claim 1, further comprising sending, from the NVDIMM upon successful completion of the Persistent Write, a Persistent Write completion indication along with the associated WID to the host.

3. The method of claim 2, wherein sending the Persistent Write completion indication comprises sending two or more Persistent Write completion indications from the NVDIMM to the host in a different order from an order in which corresponding two or more Persistent Write commands were received from the host.

4. The method of claim 1, further comprising sending a status packet from the NVDIMM to the host, the status packet comprising WIDs for Persistent Write commands whose execution has been completed.

5. The method of claim 1, wherein the WID comprises a multi-bit identification of a Persistent Write and a valid bit.

6. The method of claim 1, further comprising receiving, by the NVDIMM, a FLUSH command from the host, wherein the FLUSH command indicates that all prior writes buffered in volatile media are to be pushed to non-volatile or persistent memory.

7. The method of claim 6, further comprising sending a FLUSH completion indication upon completion of execution of the FLUSH command from the NVDIMM to the host.

8. The method of claim 1, further comprising receiving, by the NVDIMM, one or more Persistent Write commands, maintaining statuses of the one or more Persistent Write commands completed in a completed bitmap and statuses of the one or more Persistent Write commands pending in a pending bitmap, and upon request for status from the host, providing the completed bitmap if there is no uncorrectable error or the pending bitmap if there is an uncorrectable error.

9. A method of performing persistent operations, the method comprising:
   sending, from a host to a non-volatile dual in-line memory module (NVDIMM) configured to support Persistent Writes, a Persistent Write command and associated write data;
   providing a write identification (WID) associated with the Persistent Write command to the NVDIMM from the host upon successful completion of the Persistent Write;
   sending, from the host to the NVDIMM, a request to send status for multiple Persistent Writes along with associated WIDs; and
   sending from the host to the NVDIMM, a group of two or more Persistent Write commands with a common WID, with the last Persistent Write command of the group having a Persist bit set to 1 and the remaining Persistent Write commands having respective Persist bits set to 0 and receiving from the NVDIMM, a Persistent Write completion indication for the last Persistent Write,
   wherein the Persistent Write command indicates to the NVDIMM to perform a Persistent Write of the write data to a non-volatile memory.

10. The method of claim 9, further comprising receiving at the host, a Persistent Write completion indication along with the associated WID from the NVDIMM upon successful completion of the Persistent Write.

11. The method of claim 10, wherein receiving the Persistent Write completion indication comprises receiving from the NVDIMM, two or more Persistent Write completion indications in a different order from an order in which corresponding two or more Persistent Write commands were sent from the host to the NVDIMM.

12. The method of claim 11, further comprising receiving a status packet by the host from the NVDIMM, the status packet comprising WIDs for Persistent Write commands whose execution has been completed.

13. The method of claim 9, wherein the WID comprises a multi-bit identification of a Persistent Write and a valid bit.

14. The method of claim 9, further comprising sending a FLUSH command from the host to the NVDIMM, wherein the FLUSH command indicates that all prior writes buffered in volatile media are to be pushed to non-volatile or persistent memory by the NVDIMM.

15. The method of claim 14, further comprising receiving at the host, a FLUSH completion indication upon completion by the NVDIMM of execution of the FLUSH command.

16. An apparatus comprising:
a host; and
a non-volatile dual in-line memory module (NVDIMM) configured to support Persistent Writes and configured to:
receive the Persistent Write command and associated write data from the host; and
perform a Persistent Write of the write data to a non-volatile memory in the NVDIMM based on the Persistent Write command;
receive a write identification (WID) associated with the Persistent Write command from the host upon successful completion of the Persistent Write;
receive, from the host, a request to send status for multiple Persistent Writes along with associated WIDs; and
receive a group of two or more Persistent Write commands with a common WID, with the last Persistent Write command of the group having a Persist bit set to 1 and the remaining Persistent Write commands having respective Persist bits set to 0 and providing a Persistent Write completion indication for the last Persistent Write command.

17. The apparatus of claim 16, wherein the NVDIMM is further configured to provide, upon successful completion of the Persistent Write, a Persistent Write completion indication along with the associated WID to the host.

18. The apparatus of claim 17, wherein the NVDIMM is further configured to provide two or more Persistent Write completion indications to the host in a different order from an order in which corresponding two or more Persistent Write commands were received from the host.

19. The apparatus of claim 18, wherein the NVDIMM is further configured to provide a status packet to the host, the status packet comprising WIDs for Persistent Write commands whose execution has been completed.

20. The apparatus of claim 16, wherein the WID comprises a multi-bit identification of a Persistent Write and a valid bit.

21. The apparatus of claim 16, wherein the NVDIMM is further configured to receive a FLUSH command from the host, wherein the FLUSH command indicates that all prior writes buffered in volatile media are to be pushed to non-volatile or persistent memory.

22. The apparatus of claim 21, wherein the NVDIMM is further configured to provide a FLUSH completion indication upon completion of execution of the FLUSH command to the host.

23. The apparatus of claim 16, wherein the NVDIMM is further configured to receive one or more Persistent Write commands; maintain statuses of the one or more Persistent Write commands completed in a completed bitmap and statuses of the one or more Persistent Write commands pending in a pending bitmap; and upon request for status from the host, provide the completed bitmap if there is no uncorrectable error or the pending bitmap if there is an uncorrectable error.

24. An apparatus comprising:
a host configured to send a Persistent Write command and associated write data; and
a non-volatile dual in-line module (NVDIMM) configured to receive the Persistent Write command and the associated write data sent from the host,
wherein the Persistent Write command indicates to the NVDIMM to perform a Persistent Write of the write data to a non-volatile memory of the NVDIMM, and
wherein the host is further configured to provide a write identification (WID) associated with the Persistent Write command to the NVDIMM and send to the NVDIMM upon successful completion of the Persistent Write, a request to send status for multiple Persistent Writes along with associated WIDs, and to send to the NVDIMM, a group of two or more Persistent Write commands with a common WID, with the last Persistent Write command of the group having a Persist bit set to 1 and the remaining Persistent Write commands having respective Persist bits set to 0 and receive from the NVDIMM, a Persistent Write completion indication for the last Persistent Write.

25. The apparatus of claim 24, wherein the host is further configured to receive a Persistent Write completion indication along with the associated WID from the NVDIMM upon successful completion of the Persistent Write.

26. The apparatus of claim 25, wherein the host is further configured to receive from the NVDIMM, two or more Persistent Write completion indications in a different order from an order in which corresponding two or more Persistent Write commands were sent to the NVDIMM.

27. The apparatus of claim 26, wherein the host is further configured to receive a status packet from the NVDIMM, the status packet comprising WIDs for Persistent Write commands whose execution has been completed.

28. The apparatus of claim 27, wherein the WID comprises a multi-bit identification of a Persistent Write and a valid bit.

29. The apparatus of claim 24, wherein the host is further configured to send a FLUSH command to the NVDIMM, wherein the FLUSH command indicates that all prior writes buffered in volatile media are to be pushed to non-volatile or persistent memory by the NVDIMM.

30. The apparatus of claim 29, wherein the host is further configured to receive a FLUSH completion indication upon completion by the NVDIMM of execution of the FLUSH command.

* * * * *